(12) United States Patent
Mokhefi et al.

(10) Patent No.: US 11,607,823 B2
(45) Date of Patent: Mar. 21, 2023

(54) FOOD TREATMENT APPARATUS EQUIPPED WITH A PUSHING DEVICE

(71) Applicant: Electrolux Professionnel SAS, Senlis (FR)

(72) Inventors: Fabien Mokhefi, Senlis (FR); Bruno Roussat, Senlis (FR)

(73) Assignee: Electrolux Professionnel SAS, Senlis (FR)

( * ) Notice: Subject to any disclaimer, the term of this patent is extended or adjusted under 35 U.S.C. 154(b) by 256 days.

(21) Appl. No.: 16/831,925

(22) Filed: Mar. 27, 2020

(65) Prior Publication Data

US 2020/0307013 A1 Oct. 1, 2020

(30) Foreign Application Priority Data

Mar. 28, 2019 (EP) .................................. 19165854

(51) Int. Cl.
*B26D 7/06* (2006.01)
*A47J 43/046* (2006.01)
(Continued)

(52) U.S. Cl.
CPC .......... *B26D 7/0608* (2013.01); *A47J 43/046* (2013.01); *A47J 43/25* (2013.01); *A47J 44/00* (2013.01);
(Continued)

(58) Field of Classification Search
CPC ........ B26D 7/0608; B26D 9/00; B26D 3/185; B26D 2007/0018; B26D 2210/02; A47J 43/046; A47J 43/25; A47J 44/00
See application file for complete search history.

(56) References Cited

U.S. PATENT DOCUMENTS 3,610,304 A * 10/1971 Popeil .................. B26D 7/0608
241/273.1
4,819,882 A 4/1989 Stottmann et al.
(Continued)

FOREIGN PATENT DOCUMENTS

CN 108453817 8/2018
CN 110614668 12/2019
(Continued)

OTHER PUBLICATIONS

European Search Report for EP19165854 dated Jun. 4, 2019, 6 pages.
(Continued)

*Primary Examiner* — Omar Flores Sanchez
(74) *Attorney, Agent, or Firm* — Pearne & Gordon LLP (57) ABSTRACT

The invention relates to a food treatment apparatus, comprising a frame, a treatment chamber apt to receive a treatment tool and a feed channel formed by side walls with an open side for inserting food. A pushing device is configured to be inserted within the feed channel to press food towards the treatment tool. The pushing device comprises a pusher support lever pivotally movable relative to the frame around a pivot axis and a pusher rod slidably coupled to the pusher support lever to slide along a sliding axis.
Side walls are configured to allow the pusher support lever to be rotated around the pivot axis and at the same time to allow the pusher rod to be translated along said sliding axis while the pushing device is moved from an open position towards a closed position.

14 Claims, 11 Drawing Sheets

(51) Int. Cl.
 *A47J 43/25* (2006.01)
 *A47J 44/00* (2006.01)
 *B26D 9/00* (2006.01)
 *B26D 3/18* (2006.01)
 *B26D 7/00* (2006.01)

(52) U.S. Cl.
 CPC ............... *B26D 9/00* (2013.01); *B26D 3/185* (2013.01); *B26D 2007/0018* (2013.01); *B26D 2210/02* (2013.01)

(56) References Cited

U.S. PATENT DOCUMENTS

| | | | | |
|---|---|---|---|---|
| 4,821,968 | A * | 4/1989 | Fleche | A47J 43/046 241/37.5 |
| 6,510,784 | B1 * | 1/2003 | Fevre | A47J 43/0794 241/37.5 |
| 9,198,540 | B2 * | 12/2015 | Carlson | A47J 43/046 |
| 2003/0010222 | A1 * | 1/2003 | Fevre | F16P 3/08 99/510 |
| 2012/0211577 | A1 | 8/2012 | Hidalgo et al. | |
| 2015/0037480 | A1 * | 2/2015 | Carlson | A47J 43/0794 241/36 |

FOREIGN PATENT DOCUMENTS

| | | |
|---|---|---|
| EP | 0177748 | 4/1986 |
| EP | 1185820 | 4/2007 |
| ES | 2018286 | 4/1991 |

OTHER PUBLICATIONS

European Communication for application No. 19165854.1 ("Third Party Observations") dated Sep. 8, 2021, 50 pages.

* cited by examiner

FOOD TREATMENT APPARATUS EQUIPPED WITH A PUSHING DEVICE

The present invention concerns the field of food treatments.

Specifically, the invention relates to a food treatment apparatus equipped with a pushing device, such as for example apparatuses for preparing food by slicing, grating or shredding.

BACKGROUND ART

Nowadays the use of food treatment apparatuses for preparing food by slicing, grating, shredding or similar food treatment operations, is widespread.

Known food treatment apparatuses typically include a working bowl having a motor-driven shaft projecting upwardly in the centre of the bowl. A treatment tool is coupled to the shaft and rotated to perform a corresponding food treatment operation.

A detachable bowl cover is secured to the working bowl during operation of the food treatment apparatus. The bowl cover defines a feed channel for introducing food to be treated. Foods to be treated are placed into the feed channel and then pushed through the channel into engagement with the treatment tool by means of a pushing system, which is formed to be inserted into the feed channel.

EP1185820B1 discloses a treatment apparatus of this type. The pushing system disclosed therein comprises a lever pivotally movable relative to the bowl around a pivot axis and a pusher rod slidably mounted in the lever to slide along a sliding axis when it is inserted into the feed channel.

The feed channel is defined by vertical linear side walls and has an upper open side to insert food.

To perform a food treatment operation the operator firstly places the pusher rod in a high position totally extracted from the lever, inserts food into the feed channel, rotates the lever from its open position to vertically align the pusher rod to the feed channel and then axially pushes the pusher rod from its high position inside the feed channel to push the food towards the treatment tool.

After the food treatment operation is terminated, the lever is restored to its open position only after the pusher rod has been extracted up to its high position.

Known food treatment apparatuses of the known art pose some drawbacks.

A drawback of apparatuses of the known art is that movements for the operator to perform a food treatment operation are quite uncomfortable.

Also, complexity of movements for the operator is time consuming.

Another drawback of apparatuses of the known art is the relatively low loading capacity due to the shape of the feed channel.

The object of the present invention is therefore to overcome the drawbacks posed by the known technique.

It is an object of the invention to implement a food treatment apparatus that allows ergonomic/smooth movements for the operator during the food treatment operations.

It is another object of the invention to implement a food treatment apparatus that reduces time required for food treatment operations.

It is a further object of the invention to implement a food treatment apparatus having increased loading capacity compared to known apparatus.

DISCLOSURE OF THE INVENTION

Applicant has found that by providing a food treatment apparatus comprising a treatment tool, a feed channel for inserting food and a pushing device for pressing said food toward the treatment tool, wherein the pushing device comprises a rotatable pusher support lever and a pusher rod slidably mounted on the pusher support lever and by configuring the feed channel to allow the pusher rod to be translated and at the same time to allow the pusher support lever to be rotated while the pushing device is moved inside the feed channel, it is possible to reach the mentioned objects. With this arrangement, the pressing head of the pusher rod can have a roto-translational movement inside the feed channel.

In a first aspect thereof the present invention relates, therefore, to a food treatment apparatus, comprising a frame, a treatment chamber apt to receive a treatment tool, a driving device for driving the treatment tool, a feed channel formed by one or more side walls and having an open side for inserting food, and a pushing device configured to be inserted (at least partially) within the feed channel to press food towards the treatment tool. The pushing device is movable from an open position, wherein the open side of the feed channel is free for inserting food, to a closed position in which at least part of it is inserted within (i.e. extends inside) the feed channel so that food positioned therein may be pressed towards the treatment tool. Moreover, the pushing device comprises a pusher support lever pivotally movable relative to the frame around a pivot axis laterally arranged with respect to the feed channel and a pusher rod slidably coupled to the pusher support lever to slide along a sliding axis with respect to the pusher support lever. The one or more side walls are configured to allow the pusher support lever to be rotated around the pivot axis and at the same time to allow the pusher rod to be translated along the sliding axis while the pushing device is moved from the open position towards the closed position.

In more detail, the pushing device has a pressing head for pressing food inserted in the feed channel towards the treatment tool and is movable from an open position, wherein the pressing head is extracted from the feed channel, to a closed position, wherein the pressing head is inserted in the feed channel. The pushing device comprises, as said above, a pusher support lever pivotally movable relative to the frame around a pivot axis laterally arranged with respect to said feed channel and a pusher rod slidably coupled to the pusher support lever to slide along a sliding axis with respect to said pusher support lever, and the pusher rod defines the pressing head. As said above, the one or more side walls are configured to allow the pusher support lever to be rotated around said pivot axis and at the same time to allow said pusher rod, and therefore the pressing head, to be translated along the sliding axis while the pushing device is moved from the open position towards the closed position.

In other words, the side walls of the feed channels are shaped so that, during movement of the pushing device from the open position to the closed position, there can be a contemporaneous rotation of the pusher support lever with respect to the frame and translation of the pusher rod with respect to the pusher support lever. The same applies in the opening operations.

Therefore, in the closing and opening operations of the pushing device (i.e. during movements from the open to the closed position and vice versa), the pusher rod (and therefore its pressing head) can be subjected to a roto-translation movement, which provides all the advantages mentioned above.

According to a preferred embodiment of the invention, the one or more side walls comprises a first side wall positioned between the pusher rod and the pivot axis, with the pushing device and the pusher rod in the closed position, wherein the first side wall comprises a flared portion so that the distance of the flared portion with respect to the sliding axis of the pusher rod increases while proceeding towards the open side of the feed channel.

In a preferred embodiment of the invention, the first side wall comprises a first portion closer to the treatment tool and a second portion towards the open side of the feed channel, wherein the flared portion coincides with the second portion.

Preferably, the first portion extends parallelly to the sliding axis of the pusher rod, with the pusher rod in the closed position.

Preferably, the flared portion terminates at the open side of the feed channel.

In a preferred embodiment of the invention, the flared portion comprises one or more curved portions.

Preferably, said one or more side walls of the channel feed, except the first wall, extends parallelly to the sliding axis of the pusher rod, with the pusher rod in the closed position.

According to a preferred embodiment of the invention, the pushing device comprises a handle for moving the pusher support lever around the pivot axis and/or moving the pusher rod along the sliding axis.

In a preferred embodiment of the invention, the handle is arranged at an end of the pusher rod.

According to a preferred embodiment of the invention, the feed channel is part of a cover element mountable on the frame, preferably removably mountable on the frame.

In a preferred embodiment of the invention, the pusher support lever is pivotally mounted to the cover element.

Preferably, the driving device comprises a rotatable shaft connectable to the treatment tool.

Preferably, the driving device comprises an electric device.

In a further aspect thereof the present invention relates, therefore, to a method for treating food by means of a food treatment apparatus comprising:
  a frame;
  a treatment chamber apt to receive a treatment tool;
  a driving device for driving the treatment tool;
  a feed channel having an open side for inserting food;
  a pushing device being configured to be inserted within the feed channel to press food towards the treatment tool, the pushing device comprising a pusher support lever pivotally movable relative to the frame around a pivot axis and a pusher rod slidably coupled to the pusher support lever to slide along a sliding axis with respect to the pusher support lever,
  wherein the method comprises the steps of:
  positioning the pushing device in an open position so that the feed channel is free for inserting food;
  inserting food in the feed channel through the open side;
  operating said pushing device so that the pusher support lever is rotated around the pivot axis and at the same time the pusher rod is translated along the sliding axis with respect to the pusher support lever so that the pusher rod is inserted into the feed channel and food is pressed towards the treatment tool.

BRIEF DESCRIPTION OF THE DRAWINGS

Further characteristics and advantages of the present invention will be highlighted in greater detail in the following detailed description of one preferred embodiment, provided with reference to the enclosed drawings. In the drawings, corresponding characteristics and/or components are identified by the same reference numbers. In particular.

DETAILED DESCRIPTION OF A PREFERRED EMBODIMENT OF THE INVENTION

The present invention has proved to be particularly advantageous when applied to food treatment operations for slicing vegetable as described below with reference to a vegetable slicing type apparatus.

It should in any case be underlined that the present invention is not limited to vegetable slicing type apparatus. On the contrary, the present invention can be conveniently applied to treatment operations for preparing food in general by slicing, grating, shredding etc.

With reference to the Figures, a preferred embodiment of a food treatment apparatus 1 according to the invention is described, in particular a vegetable slicing apparatus. For the sake of brevity throughout the following description we will simply refer to a slicer.

The slicer 1 preferably comprises a frame 10, or base, apt to be positioned on a work plane. The slicer 1 will be assumed to be normally operated with the base 10 being supported on a horizontal work plane.

The slicer 1 comprises a treatment chamber 12, preferably configured to be mounted in a removable way on the base 10.

Figure 1:
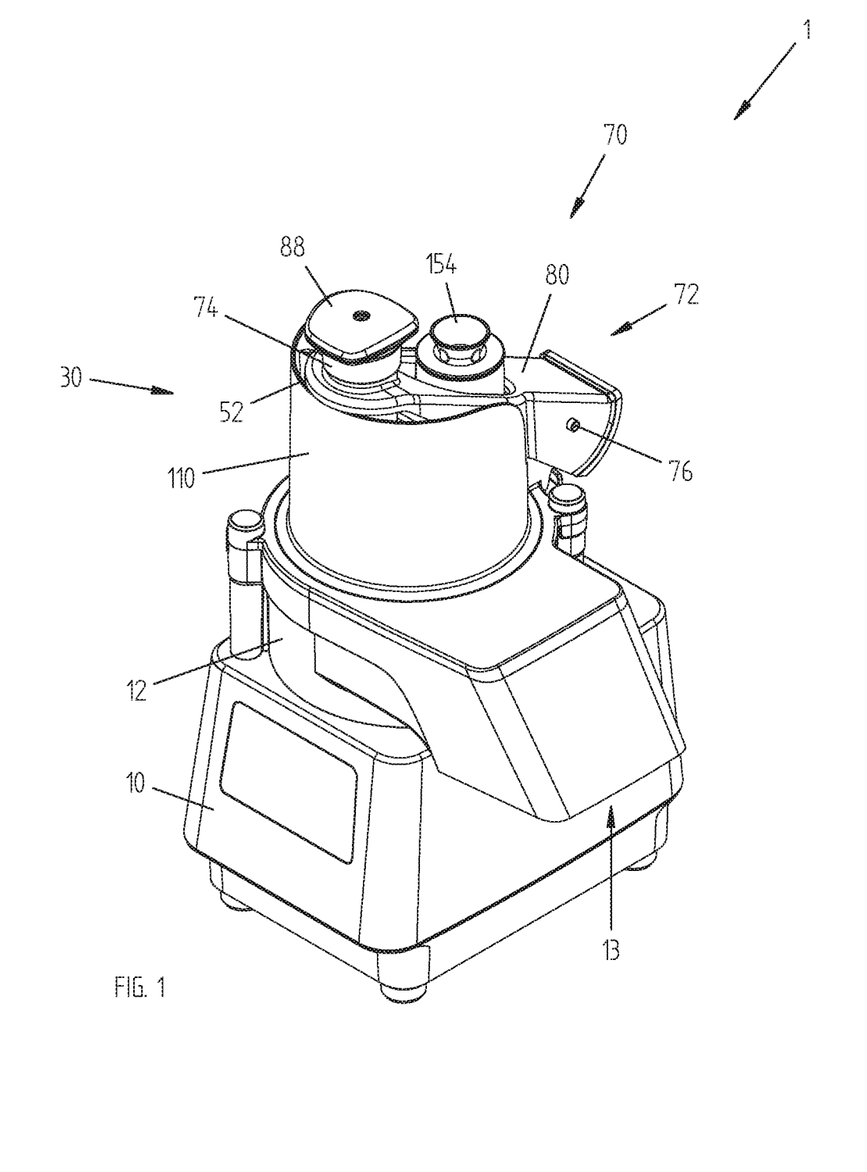
FIG. 1 shows an isometric view of a food treatment apparatus according to a first embodiment of the invention.
Figure 2:
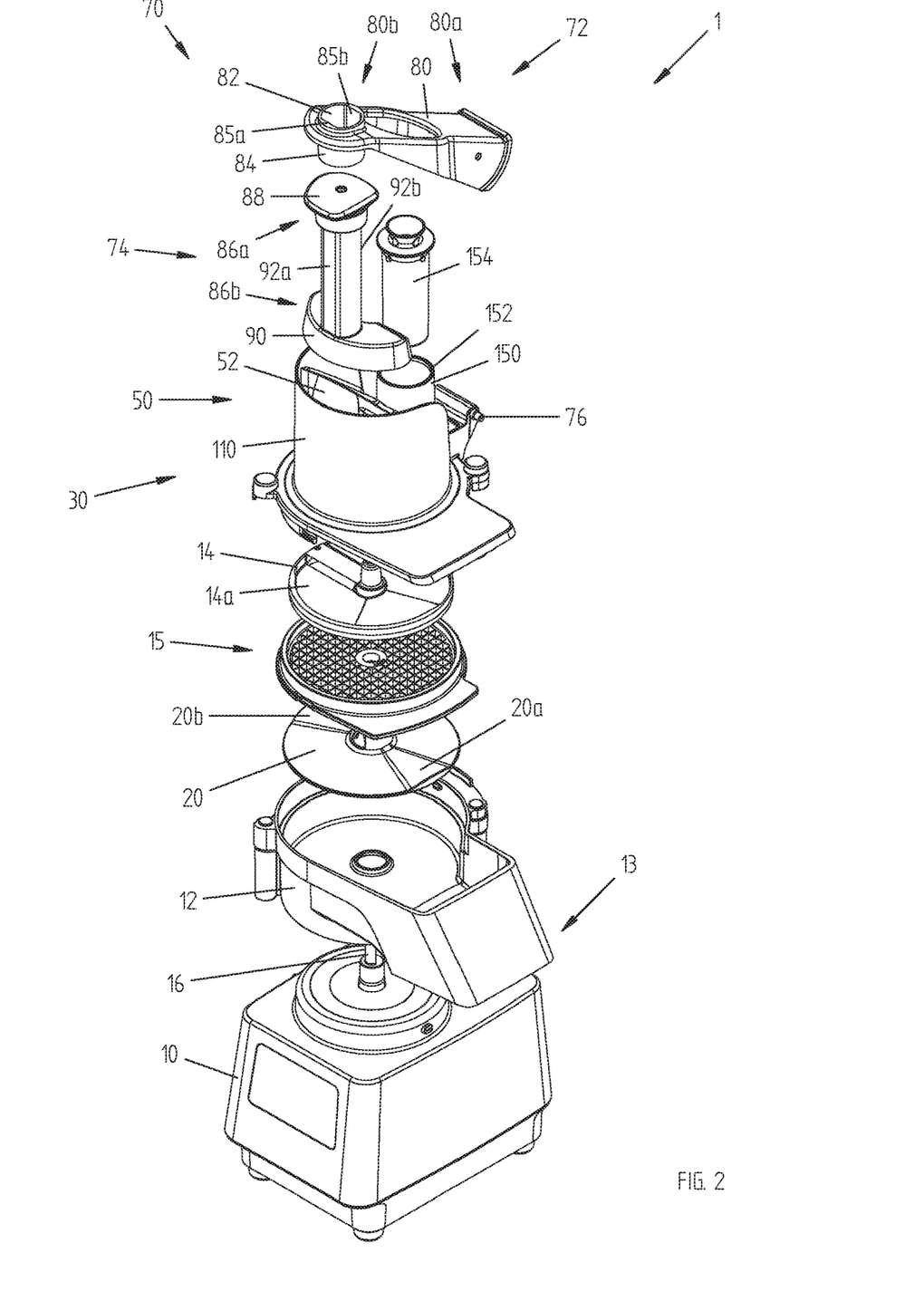
FIG. 2 shows an exploded view of apparatus of FIG. 1.
Figure 3:
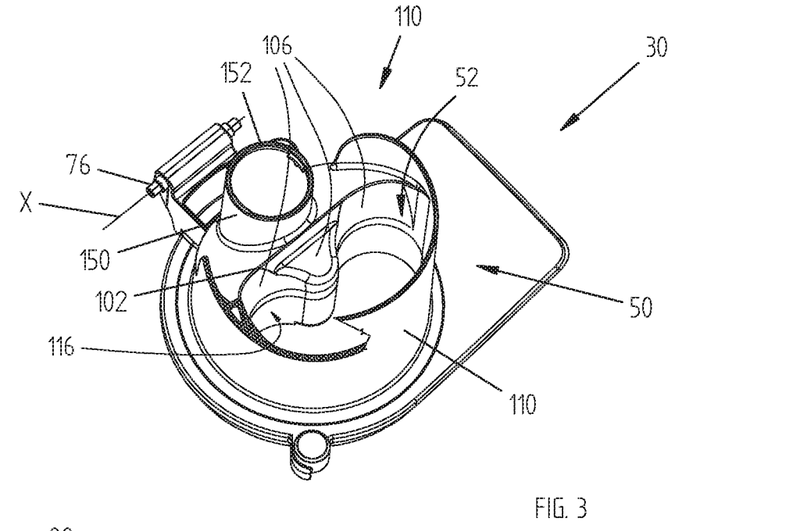
FIG. 3 shows an isometric view of an element of FIG. 2 isolated from the rest.

It has to be noted that all, or almost all, the parts of the slicer 1, as better described hereinafter and shown in FIG. 2, are preferably configured to be mounted in a removable way one onto the other. The parts are therefore preferably easily dissembled after the slicer 1 has been used and ready to be clean.

The apparatus then preferably comprises a treatment tool 14 apt to be received in the treatment chamber 12.

According to the present embodiment, the treatment tool 14 preferably comprises a cutting disc 14. It is clear that in further preferred embodiments, different types of treatment tools may be used according to the required food treatment, like for example a grater tool.

The treatment tool 14 is preferably arranged at the upper part of the treatment chamber 12 so that the treated/cut food is received in the treatment chamber 12 after its treatment/cut process.

In the preferred embodiment here illustrated and described, a dicing grid 15 is preferably arranged below the treatment tool 14. In further preferred embodiments, the dicing grid 15 may be absent.

Therefore, preferably, the food is firstly cut/sliced by the cutting disc 14 and then pressed by the same cutting disc 14 through the dicing grid 15.

The treated/cut food is received in the treatment chamber 12 as cubes of food.

In case the dicing grid 15 is absent, the food is solely cut/sliced by the cutting disc 14 and then received in the treatment chamber.

In conventional manner, the treatment tool 14 is rotatably driven by a driving device, not shown and described in detail, which is preferably received in the base 10. The driving device preferably comprises an electric motor.

A driving shaft 16 of the driving device extends inside the treatment chamber 12 and the treatment tool 14 is connected thereto. Preferably, the treatment tool 14 is removably connected to the driving shaft 16.

Figure 6:
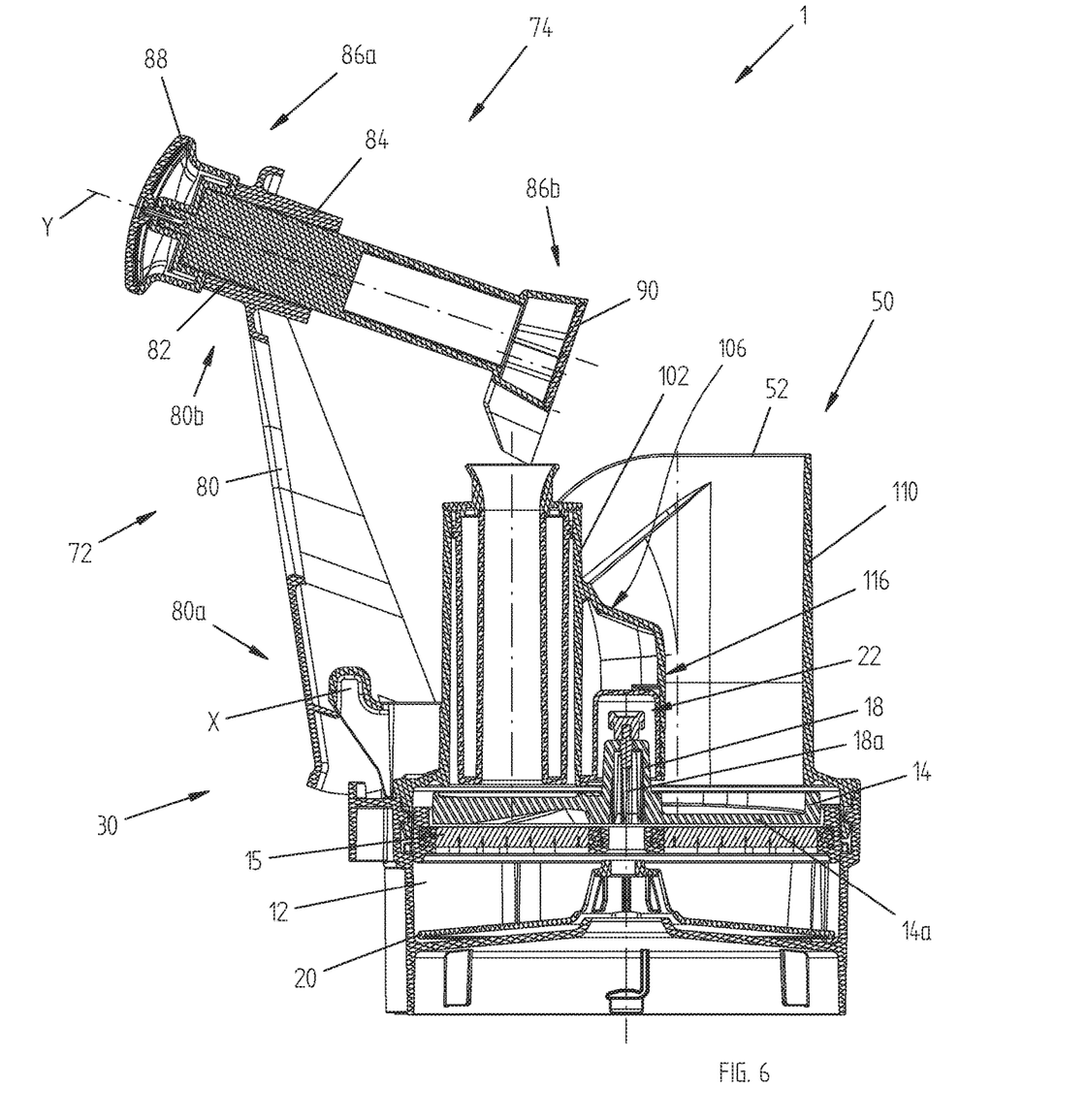
FIG. 6 is a plan vertical section view of FIG. 4.

The treatment tool 14 preferably comprises a central seat 18, as visible on FIG. 6, with internal splines 18*a* apt to engage corresponding external splines, not visible, of the driving shaft 16. A screw 22 is preferably used to fix the treatment tool 14 to the driving shaft 16.

In different embodiments, not illustrated, different equivalent fixing means may be used to couple the treatment tool 14 to the driving shaft 16.

While the treatment tool 14 is rotated/rotatable by the driving shaft 16, the dicing grid 15 is keep steady inside the treatment chamber 12.

In the preferred embodiment here illustrated, the treated/cut food which is received in the treatment chamber 12 is preferably ejected outside the slider 1.

At this purpose the cutting treatment chamber 12 preferably comprises a discharging outlet 13 opportunely shaped so that the treated food is preferably ejected outside and downwardly. The treated food may be collected in a container bowl opportunely arranged below the discharging outlet 13.

An ejector device 20 is preferably arranged inside the treatment chamber 12 to facilitate food ejection. The ejector device 20 is preferably rotated by the driving shaft 16 and preferably comprises bulges 20*a*, 20*b* apt to push the treated food towards the discharging outlet 13 when the driving shaft 16 rotates.

In further preferred embodiments, the treatment chamber does not comprise a discharging system and the treated food is received and maintained in the treatment chamber after its treatment. The treatment chamber is opportunely emptied by the operator for successive uses.

The driving shaft 16 rotates around a driving axis, preferably a vertical driving axis, and the treatment tool 14 (cutting disc) preferably shows a treatment area 14*a* (cutting area 14*a*) that extends on a plane perpendicular to the driving axis.

The apparatus then comprises a cover element 30, preferably configured to be mounted in a removable way above the treatment chamber 12.

The cover element 30 preferably comprises a feed channel 50, or hopper, having an upper open side 52 wherein food to be treated may be inserted.

The feed channel 50 downwardly faces the treatment tool 14 so that food inserted therein may come into contact with the treatment tool 14.

According to an aspect of the invention, the apparatus then preferably comprises a pushing device 70, which is operable by the operator so that part of it can be inserted within the feed channel 50.

The pushing device 70 enhances the treatment process of food by pressing it against the treatment tool 14, as better described later.

Figure 4:
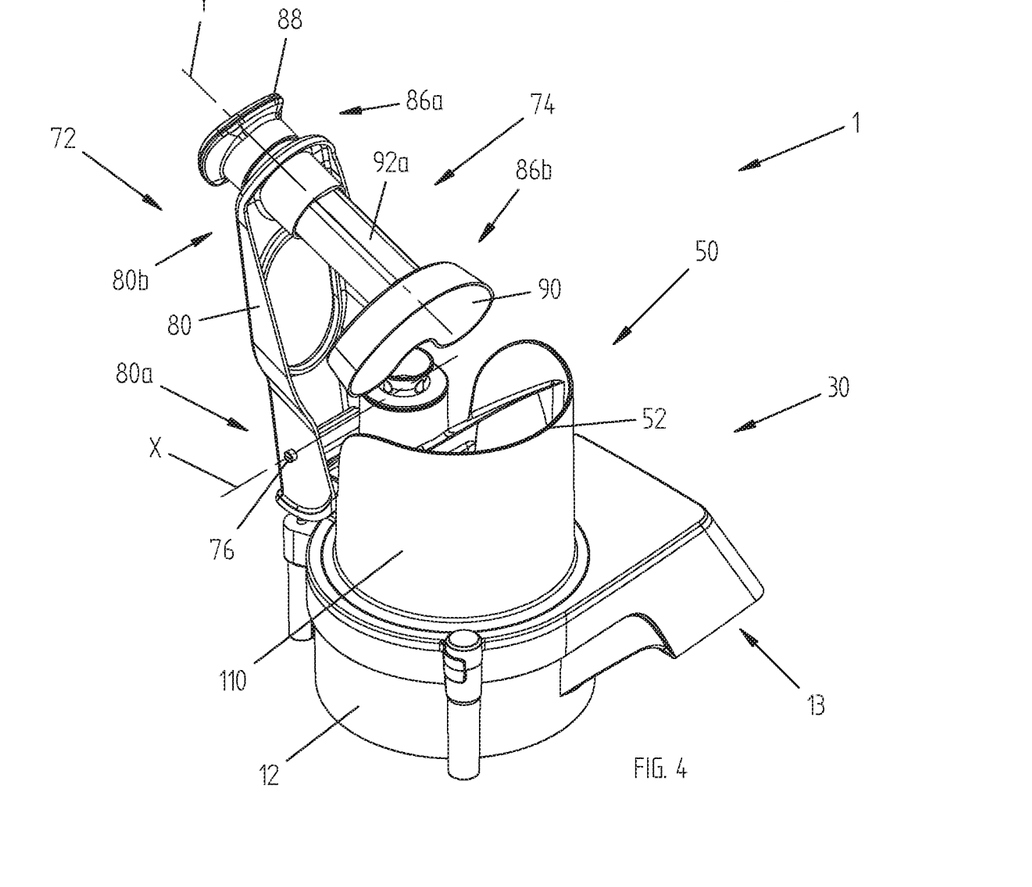
FIG. 4 shows the upper part of the apparatus of FIG. 1 in a first operative position (open position)
Figure 5:
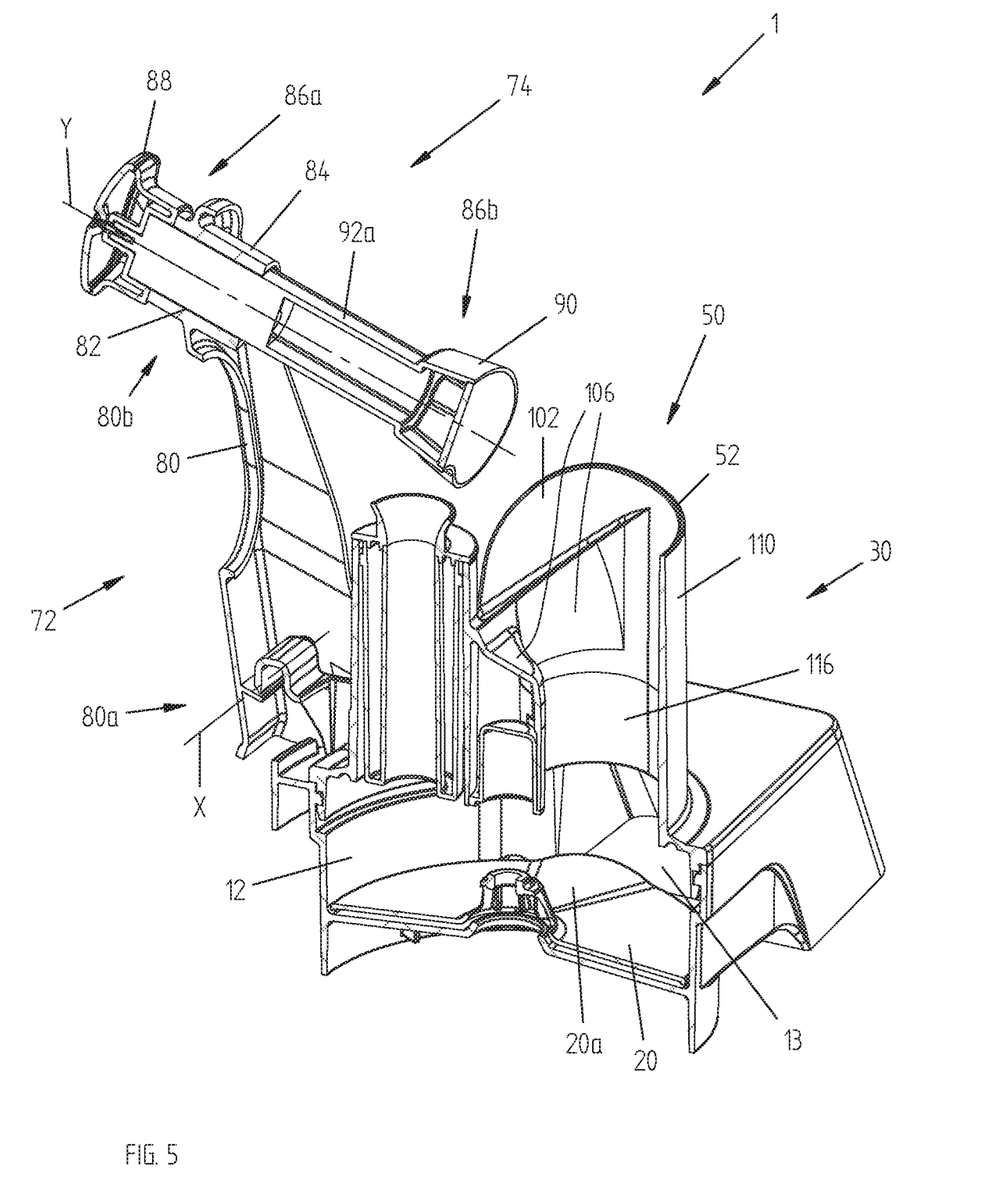
FIG. 5 shows an isometric vertical section view of FIG. 4.
Figure 11:
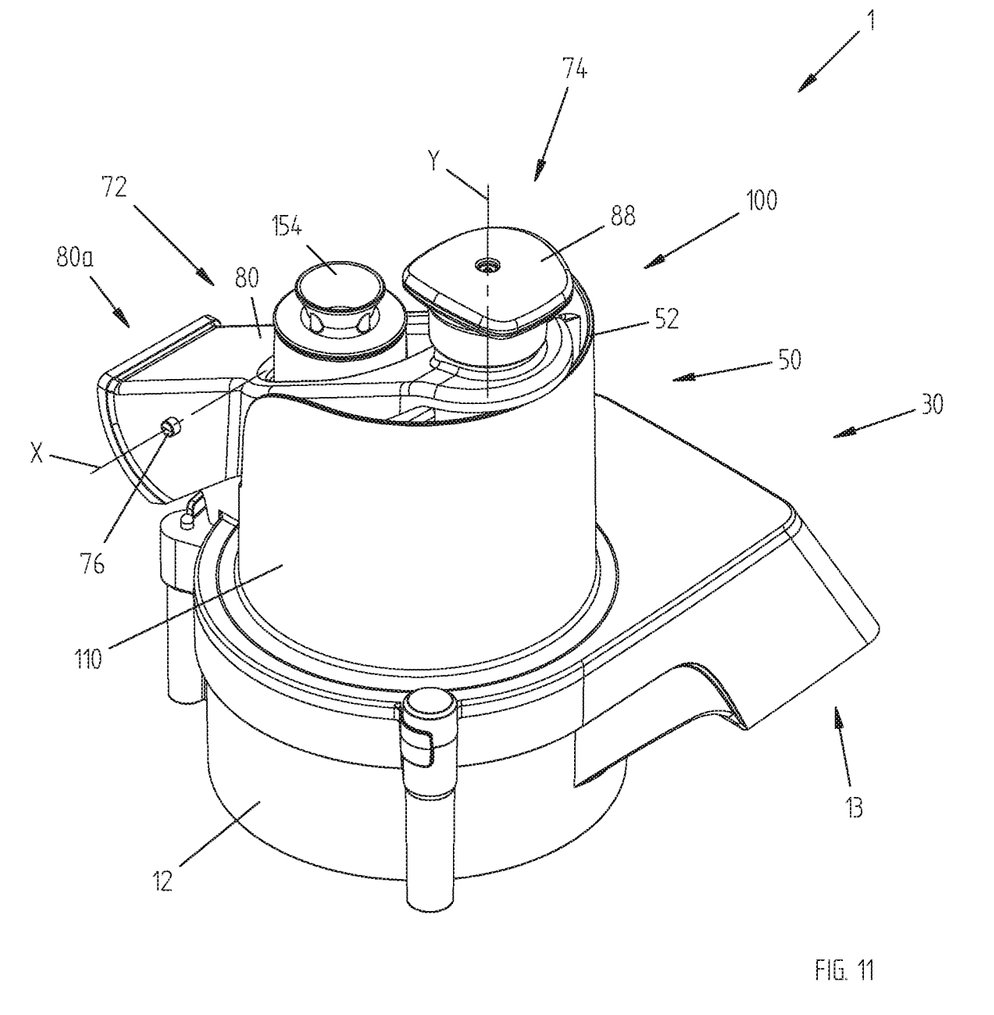
FIG. 11 shows the upper part of the apparatus of FIG. 1 in a fourth operative position (closed position)
Figure 12:
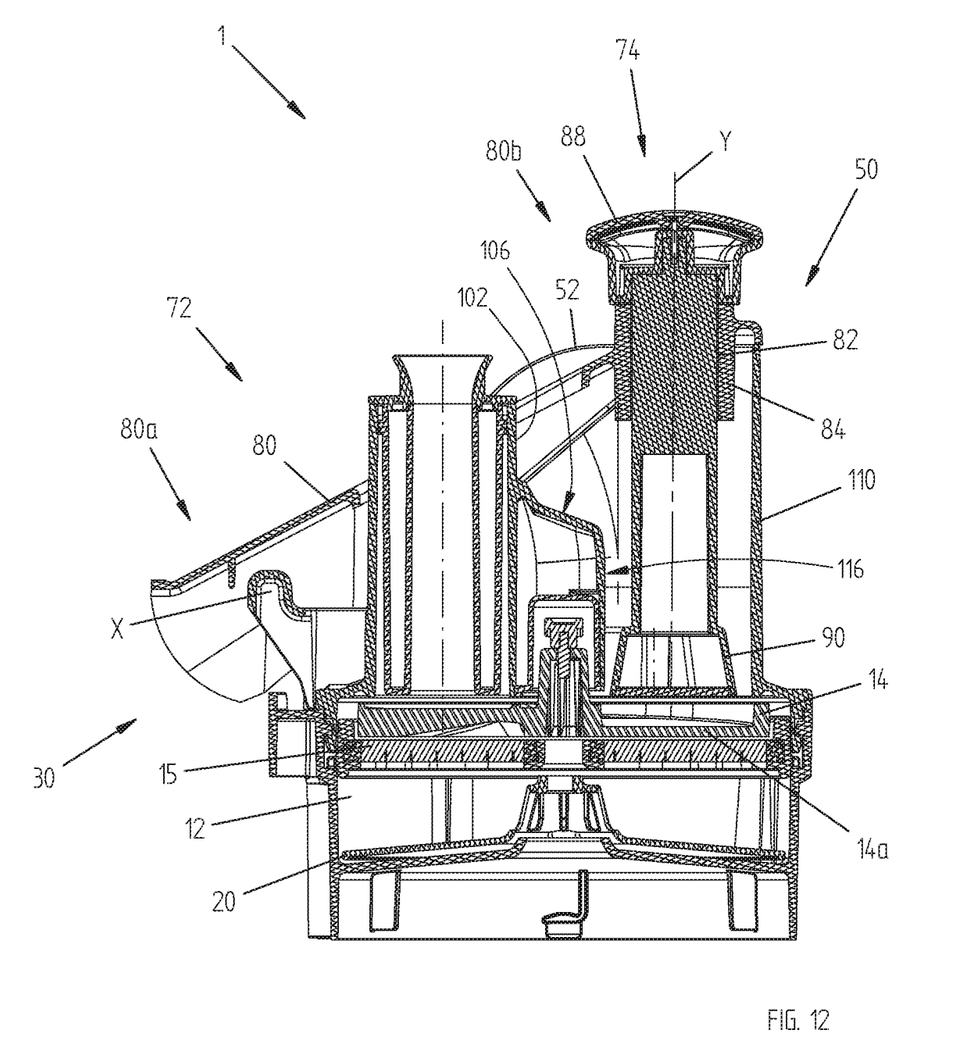
FIG. 12 is a vertical section view of FIG. 11.

The pushing device 70 is configured to be movable from an open position, for example the position illustrated in FIGS. 4 to 6, wherein the open side 52 of the feed channel 50 is free and food may be easily inserted therein, to a closed position, for example the position illustrated in FIGS. 11 and 12. During movements of the pushing device 70 from open to closed positions, food is advantageously pressed towards the treatment tool 14.

To ensure safety of use, the slicer 1 is preferably provided with a safety device, not illustrated and described in detail, intended to cut off the power supply of the driving device when the position of the pushing device 70 allows access to the feed channel 50 and thus to the treatment tool 14.

According to an aspect of the invention, the pushing device 70 preferably comprises a pusher support lever 72 pivotally movable relative to the base 10 around a pivot axis X and a pusher rod 74 slidably coupled to the pusher support lever 72 to slide along a sliding axis Y with respect to the pusher support lever 72.

The pivot axis X is laterally arranged with respect to the feed channel 50.

Furthermore, according to the preferred embodiment, the pusher support lever 72 is pivotally mounted to the cover element 30, preferably through a hinge device 76.

Nevertheless, according to other embodiments not illustrated, the pusher support lever could be pivotally coupled to the treatment chamber 12 or to the base member 10.

The pusher support lever 72 preferably comprises an arm 80 with a first end 80*a* pivotally connected to the cover element 30 through said hinge device 76 and a second end 80*b* provided with an opening 82 for slidably receiving the pusher rod 74. Opening 82 is preferably realized in a substantially cylindrical sleeve 84 at the second end 80*b* of the arm 80.

The pusher rod 74 preferably comprises a first end 86*a* provided with a handle 88 and a second end 86*b* provided with a pressing head 90. The pusher rod 74 longitudinally extends along the sliding axis Y and can slide along the same axis Y with respect to pusher support lever 72. Preferably, rotation of the pusher rod 74 with respect to pusher support lever 72 is avoided by means of planar surfaces 85*a*, 85*b* of the opening 82 that interact with respective planar surfaces 92*a*, 92*b* of the pusher rod 74.

The feed channel 50 is formed by side walls 100 terminating upwardly in the open side 52.

According to an aspect of the invention, side walls 100 of the feed channel 50 are configured so that the pusher support lever 72 may rotated around the pivot axis X and at the same time the pusher rod 74 may translate along the sliding axis Y with respect to the pusher support lever 72 while the pushing device 70 is moved from the open position towards the closed position to carry out the food treatment.

In FIGS. 4 to 12 different operative positions of the slicer 1 and of the pushing device 70 are depicted, where the pusher rod 74 and the pusher support lever 72 have different positions with respect to the feed channel 50 and/or different relative positions therebetween.

By comparing the pushing device 70 in the open position (FIG. 6) and in the closed position (FIG. 12), it can be appreciated that the pusher support lever 72 is allowed to rotate about the pivot axis X of an angle, hereinafter indicated as maximum rotation angle.

FIGS. 4 to 6 show the pushing device 70 in an open position, as said above, wherein the open side 52 of the feed channel 50 is free for inserting food.

The pusher support lever 72 is at its maximum open position about the pivot axis X and the pusher rod 74 is preferably totally inserted into the opening 82 of the pusher support lever 72. In the open position, the pusher rod 74 does not necessarily need to be totally inserted into the opening 82 of the pusher support lever 72.

Figure 7:
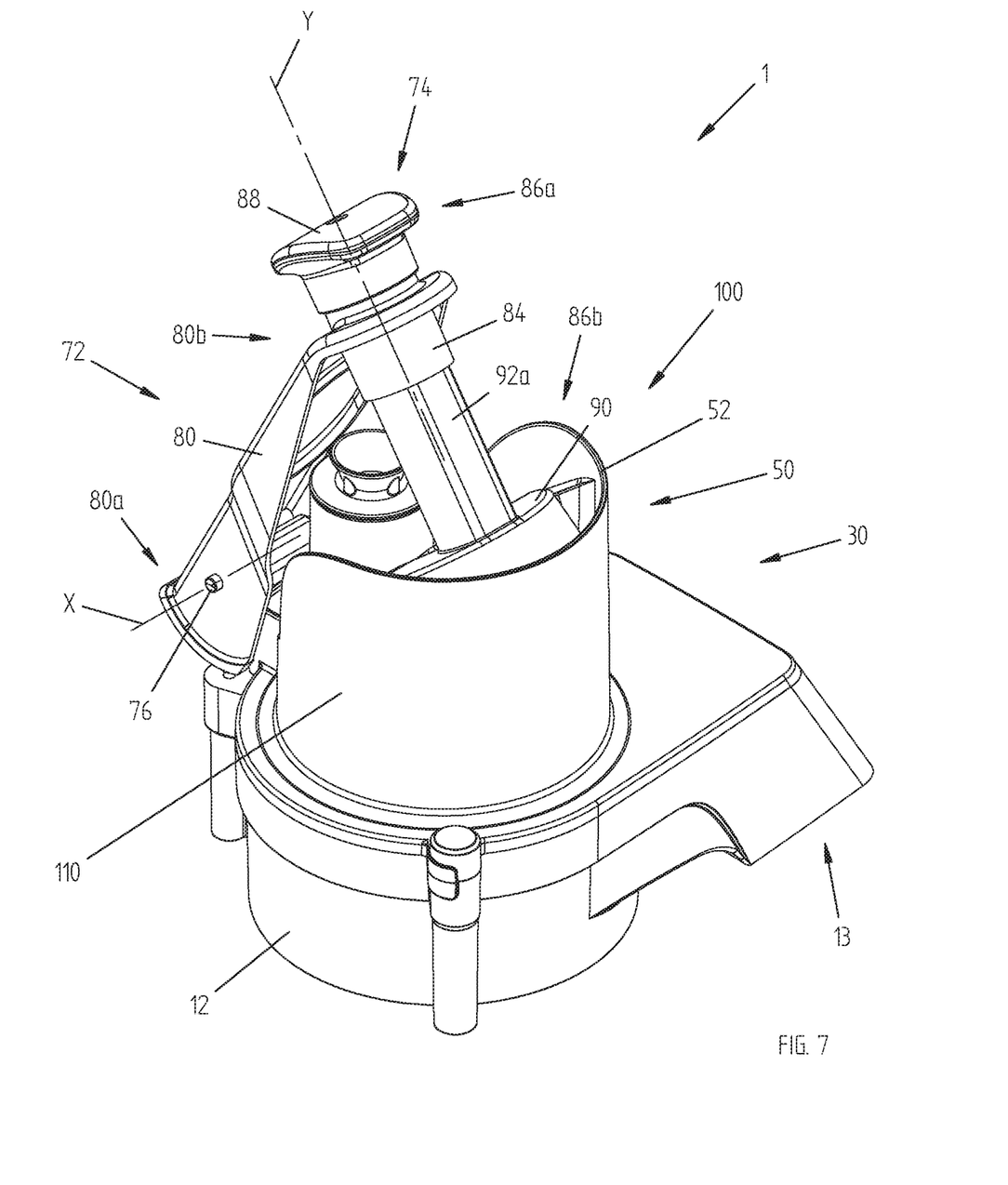
FIG. 7 shows the upper part of the apparatus of FIG. 1 in a second operative position.
Figure 8:
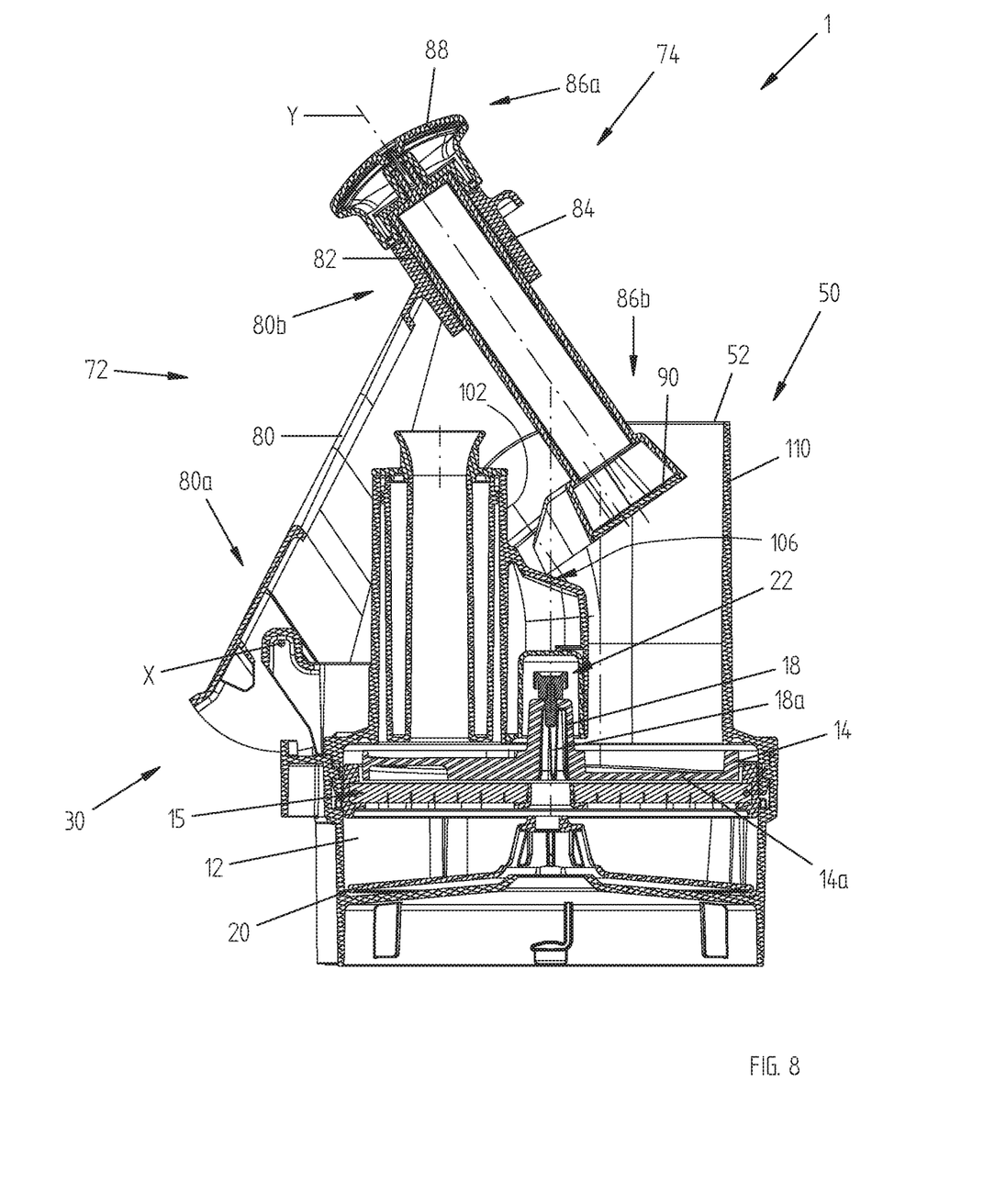
FIG. 8 is a vertical section view of FIG. 7.

FIGS. 7 and 8 show the pushing device 70 in a successive first intermediate position while the pushing device 70 is moved towards the closed position. The pusher support lever 72 is rotated about the pivot axis X of a predetermined angle and the pusher rod 74 is preferably maintained totally inserted into the opening 82 of the pusher support lever 72. The pushing device 70 is advantageously moved by the operator gripping the handle 88 of the pusher rod 74.

Figure 9:
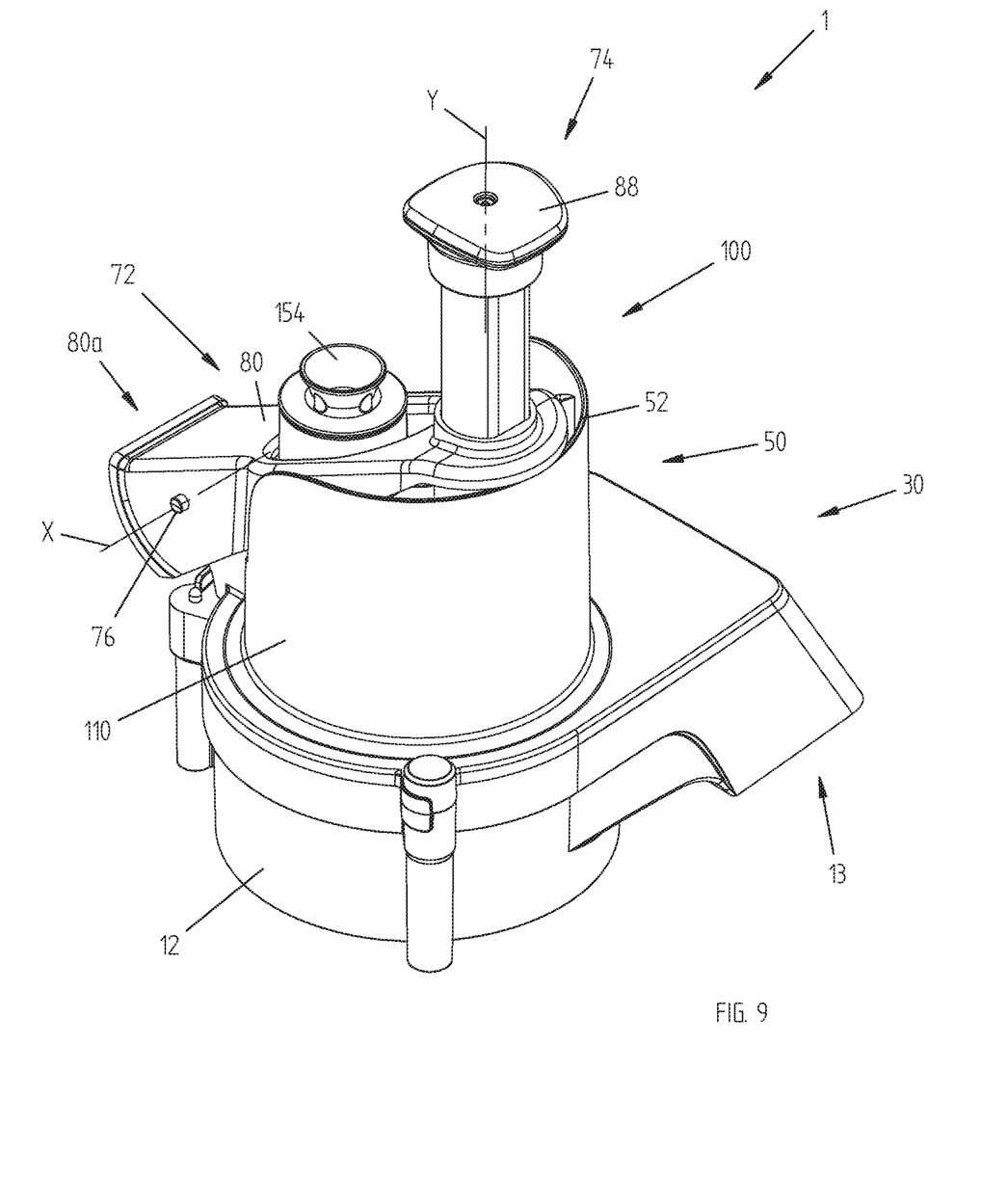
FIG. 9 shows the upper part of the apparatus of FIG. 1 in a third operative position.
Figure 10:
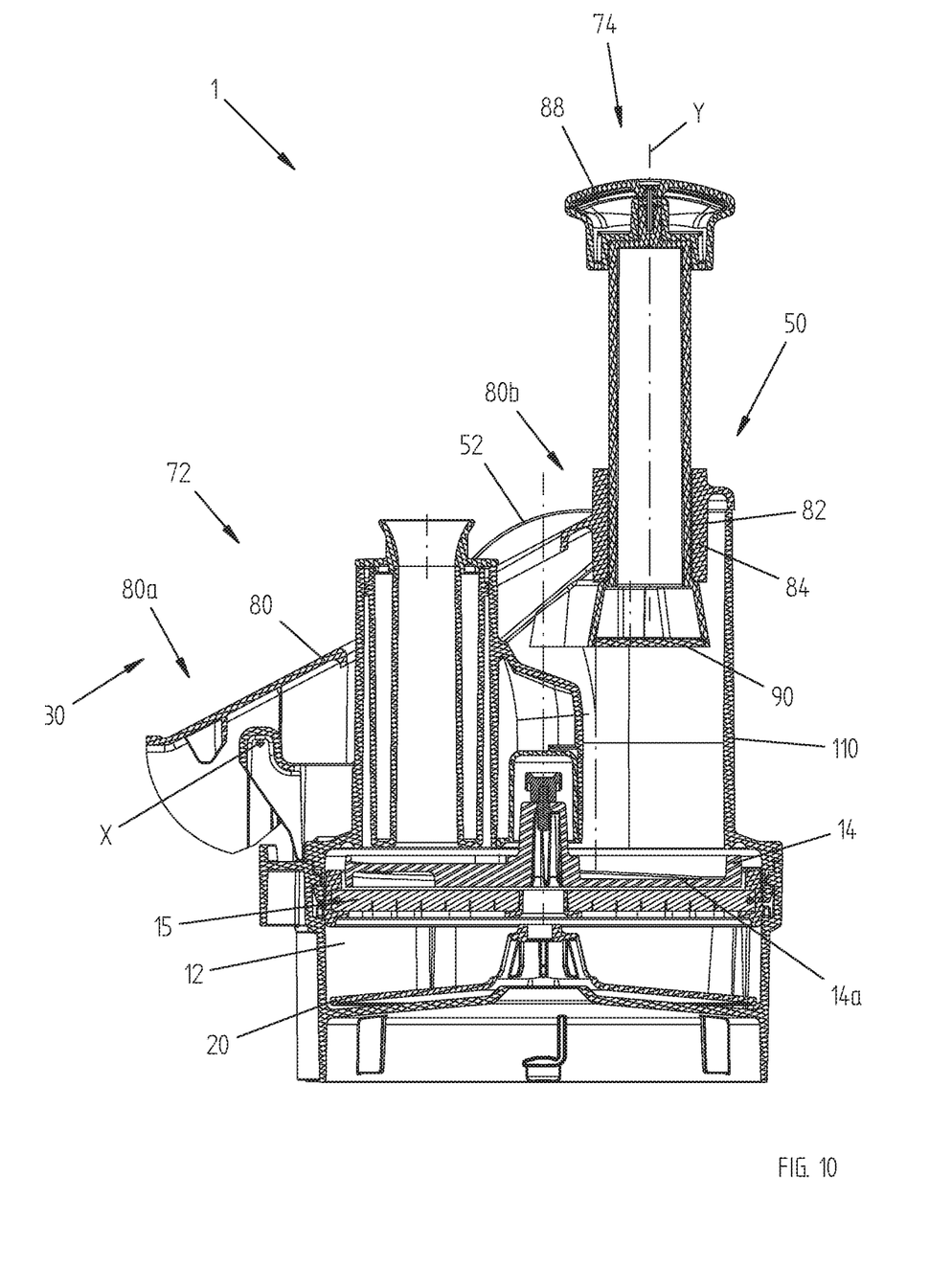
FIG. 10 is a vertical section view of FIG. 9.

FIGS. 9 and 10 show the pushing device 70 in a successive second intermediate position while the pushing device 70 is further moved towards the closed position. The pusher support lever 72 is further rotated about the pivot axis X of the maximum rotation angle. At the same time, the pusher rod 74 slides with respect to the pusher support lever 72 to be displaced in a high position totally extracted from the support lever 72. In particular, the pusher rod 74 slides to the high position due to the contact of the pressing head 90 with the food inside the feed channel 50.

FIGS. 11 and 12 show the pushing device 70 in the successive final closed position. The pusher support lever 72 is maintained at the maximum rotation angle and the pusher rod 74 slides into the opening 82 of the pusher support lever 72 to be totally inserted therein and totally inserted into the feed channel 50. Food is thus pressed towards the treatment tool 14.

The rotational movement of the pusher support lever 72 about the pivot axis X and the translation movement of the pusher rod 74 along the sliding axis Y are independent movements that advantageously permits a fluent, ergonomic and fast movement for the operator operating the pushing device 70 from the open position to the closed position when the food is being treated.

Furthermore, independency between rotational and translation movements causes the pushing device 70 to adapt itself to the load of food inside the feed channel 50. If the load is small, the pushing device 70 acts substantially as a simple lever, with the pusher rod 74 and the pusher support lever 72 maintaining substantially the same relative position while the pusher support lever 72 rotates about the pivot axis X.

If the load is high, the pusher rod 74 slides with respect to the pusher support lever 72 while the pusher support lever 72 rotates about the pivot axis X, as described above with reference to FIGS. 9 and 10, so that the translation of the pusher rod 74 is acting to absorb the high load.

Furthermore, advantageously, independent movements of the pusher support lever 72 and of the pusher rod 74 speed the restoring movements of the pushing device 70 when the operator moves the pushing device 70 from the closed position to the open position after the food has been treated (i.e. from closed position shown on FIGS. 11 and 12 to the open position shown on FIGS. 4 to 6).

Therefore, the pusher support lever 72 and the pusher rod 74 can concurrently rotate and translate either when the pushing device 70 is closed or when the pushing device 70 is opened, contrary to know system where the lever is first totally rotated and the pusher rod is successively translated, when the pushing device is closed, or the pusher rod is first translated up to its high position and the lever is rotated, when the pushing device is opened.

Complexity of movements for the operator as in the known system is therefore avoided.

As said above, side walls 100 of the feed channel 50 are configured so that the pusher rod 74 and the pusher support lever 72 may concurrently translate and rotate, respectively.

Preferably, side walls 100 comprises a first side wall 102, or rear wall 102, which is configured so that the pusher rod 74 and the pusher support lever 72 may concurrently translate and rotate, respectively.

The rear wall 102 is the wall of the feed channel 50 that is closest to the pivot axis X axis of the pusher support lever 72, i.e. the wall positioned between the pusher rod 74 and the pivot axis X, considering the pushing device 70 and the pusher rod 74 in the closed position (FIG. 12).

According to an aspect of the invention, the rear wall 102 preferably comprises a flared portion 106. This flared portion 106 is advantageously in the upper part of rear wall 102. In particular, the flared portion 106, as better illustrated in FIG. 12, is opportunely shaped so that the distance of the flared portion 106 with respect to the sliding axis Y of the pusher rod 74, in the closed position, increases while proceeding towards the open side 52 of the feed channel 50.

Advantageously, when the pushing device 70 is moved from the open position to the closed position, or vice-versa, with the pusher rod 74 translating and the pusher support lever 72 rotating, the pressing head 90 of the pusher rod 74 does not collide with the rear wall 102 thanks to the flared portion 106 of the rear wall 102.

For example, as illustrated in FIG. 8, when the pusher support lever 72 rotates and the pusher rod 74 is totally inserted into the opening 82 of the pusher support lever 72, the pressing head 90 of the pusher rod 74 does not collide with the rear wall 102 thanks to the flared portion 106 of the rear wall 102.

Preferably, the other side walls of the feed channel 50, globally indicated with the reference number 110, extend parallelly to the sliding axis Y of the pusher rod 74 in the closed position. Side walls 110 are preferably cylindrically-shaped.

In a preferred embodiment, the rear wall 102 comprises a first portion (or lower portion) 116 closer to the treatment tool 14 and a second portion (or upper portion) 106 towards the open side 52 of the feed channel 50, wherein the flared portion 106 coincide with said second portion 106.

The first portion 116 preferably extends parallelly to the sliding axis Y of the pusher rod 74 in the closed position.

In the preferred embodiment illustrated and described herein, the length of the first portion 116 is substantially one third of the total height of the feed channel 50.

The length of the second/flared portion 106 is thus preferably substantially two-third of the total height of the feed channel 50.

In further preferred embodiments, the flared portion extends along said rear wall for its entire length.

The second/flared portion 106 then preferably terminates at the open side 52 of the feed channel 50.

The second/flared portion 106 preferably comprises one or more curved portions joined therebetween.

In the preferred embodiment illustrated and described herein, the feed channel 50 shows a bean-shaped section; more preferably, the portion of the feed channel 50 close to the treatment tool 14 shows a bean-shaped section.

Also, preferably, the pressing head 90 of the pusher rod 74 is bean-shaped, preferably with a slightly reduced section compared to the feed channel 50 so that it may slide freely into it.

In further preferred embodiments, nevertheless, the feed channel or the pressing head of the pushing may have other forms, preferably substantially equal each other.

According to the invention, furthermore, the second/flared portion 106 advantageously permits to increase the loading capacity of the channel feed 50, hence increasing the productivity/performance of the slicer.

In the preferred embodiment here illustrated and described, the cover element 30 preferably further comprises a second feed channel 150 having an upper open side 152 wherein food to be treated may also be inserted. The second feed channel 150 is preferably cylindrically shaped. A second pusher rod 154 is operable by the operator to be inserted within the feed channel 150. The second pusher rod 154 is also preferably cylindrically shaped. The second feed channel 150 downwardly faces the treatment tool 14 so that food inserted therein may come into contact with the treatment tool 14.

In further preferred embodiments, not shown, the second feed channel may be absent, and the slicer therefore comprises only one feed channel.

It has thus been shown that the present invention allows all the set objects to be achieved. In particular, it makes it possible to provide a food treatment apparatus that allows ergonomic/smooth movements for the operator during the food treatment operations compared to known apparatus.

While the present invention has been described with reference to the particular embodiment shown in the figures, it should be noted that the present invention is not limited to the specific embodiment illustrated and described herein; on the contrary, further variants of the embodiments described herein fall within the scope of the present invention, which is defined in the claims.

The invention claimed is:

1. A food treatment apparatus, comprising:
   a frame;
   a treatment chamber apt to receive a treatment tool;
   a driving device for driving said treatment tool;
   a feed channel formed by one or more side walls and having an open side for inserting food; and
   a pushing device being configured to be inserted within said feed channel to press food towards said treatment tool, said pushing device being movable from an open position, wherein said open side of said feed channel is free for inserting food, to a closed position where at least part of said pushing device is inserted in said feed channel so that food positioned therein may be pressed towards said treatment tool, said pushing device comprising a pusher support lever pivotally movable relative to said frame around a pivot axis laterally arranged with respect to said feed channel and a pusher rod slidably coupled to said pusher support lever to slide along a sliding axis with respect to said pusher support lever, wherein said one or more side walls are configured to allow said pusher support lever to be rotated around said pivot axis and at the same time to allow said pusher rod to be translated along said sliding axis while said pushing device is moved from said open position towards said closed position;
   wherein said one or more side walls comprises a first side wall positioned between said pusher rod and said pivot axis with said pushing device and said pusher rod in said closed position, wherein said first side wall comprises a flared portion a distance between which and said sliding axis of said pusher rod increases towards said open side of said feed channel with said pushing device in said closed position.

2. Apparatus according to claim 1, wherein said first side wall comprises a first portion closer to said treatment tool and a second portion towards said open side of said feed channel, wherein said flared portion coincides with said second portion.

3. Apparatus according to claim 2, wherein said first portion extends parallel to said sliding axis of said pusher rod, with said pusher rod in said closed position.

4. Apparatus according to claim 1, wherein said flared portion terminates at said open side of said feed channel.

5. Apparatus according to claim 1, wherein said flared portion comprises one or more curved portions.

6. Apparatus according to claim 1, wherein said one or more side walls of said feed channel, except said first wall, extends parallel to said sliding axis of said pusher rod, with said pusher rod in said closed position.

7. Apparatus according to claim 1, wherein said pushing device further comprises a handle for moving said pusher support lever around said pivot axis and/or moving said pusher rod along said sliding axis.

8. Apparatus according to claim 7, wherein said handle is arranged at an end of said pusher rod.

9. Apparatus according to claim 1, wherein said feed channel is part of a cover element mountable on said frame.

10. Apparatus according to claim 9, wherein said pusher support lever is pivotally mounted to said cover element.

11. Apparatus according to claim 1, said driving device comprising a rotatable shaft connectable to said treatment tool.

12. Apparatus according to claim 1, said driving device comprising an electric device.

13. A method for treating food by means of a food treatment apparatus comprising:
    a frame;
    a treatment chamber apt to receive a treatment tool;
    a driving device for driving said treatment tool;
    a feed channel having an open side for inserting food and one or more side walls; and
    a pushing device being configured to be inserted within said feed channel to press food towards said treatment tool, said pushing device comprising a pusher support lever pivotally movable relative to said frame around a pivot axis and a pusher rod slidably coupled to said pusher support lever to slide along a sliding axis with respect to said pusher support level;
    wherein said one or more side walls comprises a first side wall positioned between said pusher rod and said pivot axis with said pushing device and said pusher rod in said closed position, wherein said first side wall comprises a flared portion a distance between which and said sliding axis of said pusher rod increases towards said open side of said feed channel with said pushing device in said closed position,
    said method comprising the steps of:
       positioning said pushing device in an open position so that said feed channel is free for inserting food;
       inserting food in said feed channel through said open side;
       operating said pushing device so that said one or more side walls allow said pusher support lever to be rotated around said pivot axis and at the same time said pusher rod is translated along said sliding axis with respect to said pusher support lever so that said pusher rod is inserted into said feed channel and food is pressed towards said treatment tool.

14. Apparatus according to claim 9, wherein said cover element is removably mountable on said frame.

\* \* \* \* \*